US010289132B2

(12) United States Patent
Baker

(10) Patent No.: US 10,289,132 B2
(45) Date of Patent: May 14, 2019

(54) AUTOMATED ENGINEERING OF BUILDING AUTOMATION SYSTEMS

(71) Applicant: Siemens Industry, Inc., Alpharetta, GA (US)

(72) Inventor: Jan L. Baker, Long Grove, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 556 days.

(21) Appl. No.: 14/864,304

(22) Filed: Sep. 24, 2015

(65) Prior Publication Data
US 2017/0090492 A1    Mar. 30, 2017

(51) Int. Cl.
  G05D 23/13    (2006.01)
  G05B 19/042   (2006.01)
  G06F 17/50    (2006.01)

(52) U.S. Cl.
  CPC ....... *G05D 23/1393* (2013.01); *G05B 19/042* (2013.01); *G05B 19/0426* (2013.01); *G05B 2219/2614* (2013.01)

(58) Field of Classification Search
  CPC .... Y02B 70/3241; Y04S 20/227; G05B 15/02
  USPC ........................................................ 700/276
  See application file for complete search history.

(56) References Cited

U.S. PATENT DOCUMENTS

| | | | | |
|---|---|---|---|---|
| 4,885,694 A * | 12/1989 | Pray | ................... | G06F 17/5004 705/400 |
| 6,859,768 B1 * | 2/2005 | Wakelam | ........... | G06F 17/5004 703/1 |
| 6,965,848 B2 * | 11/2005 | Ballus | ................. | G06F 17/5004 454/231 |
| 8,406,477 B2 * | 3/2013 | Chen | ...................... | G06T 19/00 345/419 |
| 9,441,847 B2 * | 9/2016 | Grohman | ............... | G05B 15/02 |
| 9,891,636 B2 * | 2/2018 | Wu | ......................... | F24F 11/30 |
| 9,929,872 B2 * | 3/2018 | Keenan, Jr. | ........... | G05B 15/02 |
| 10,007,240 B2 * | 6/2018 | Landou | .................. | G05B 15/02 |
| 10,139,123 B2 * | 11/2018 | Quam | ..................... | F24F 11/63 |
| 2002/0016639 A1 * | 2/2002 | Smith | .................... | G05B 15/02 700/9 |
| 2004/0260431 A1 * | 12/2004 | Keenan, Jr. | ........... | G05B 15/02 700/295 |
| 2009/0271154 A1 * | 10/2009 | Coad | .................... | F24F 11/0086 703/1 |
| 2011/0209081 A1 * | 8/2011 | Chen | ...................... | G06F 17/50 715/771 |
| 2011/0276167 A1 * | 11/2011 | Schmidtke | .......... | G05B 19/042 700/106 |
| 2013/0035794 A1 * | 2/2013 | Imani | ................... | F24F 11/0009 700/276 |

(Continued)

OTHER PUBLICATIONS

Siemens APOGEE PPCL_Users_Manual, Oct. 2000, Siemens Building Technologies, Inc., Rev. 5, all pages.*

(Continued)

*Primary Examiner* — Victoria K. Hall

(57) ABSTRACT

An approach for generating programming for a system is disclosed where a user answers initial hardware and configuration questions and an application controlled by a processor generates a program using multi-associational data model for execution by a system controller, points list, point cross reference list, sequence of operation, commissioning checklist, functional tests, and flowchart.

17 Claims, 22 Drawing Sheets

(56) References Cited

U.S. PATENT DOCUMENTS

| | | | |
|---|---|---|---|
| 2014/0312128 A1 | 10/2014 | Matsuoka et al. | |
| 2015/0127174 A1* | 5/2015 | Quam | F24F 11/0086 700/276 |
| 2015/0168964 A1* | 6/2015 | Wu | F24F 11/006 700/276 |
| 2015/0229488 A1* | 8/2015 | Averitt | H04L 12/2809 455/420 |
| 2016/0086045 A1* | 3/2016 | Roberts | G06K 9/3216 382/183 |

OTHER PUBLICATIONS

Canadian Examiner's Report dated Oct. 23, 2017, for CA Application No. 2,942,767, 5 pages.

\* cited by examiner

```
 92 C ----- DEFINE NAMES, CREATE LOCAL POINTS -----         <--400
 99 C
100 DEFINE (X,"PAT.A1.")
110 LOCAL (AVGSVP,AVGRVP)
130 SAMPLE (60) "%X%OAT" = "%X%OAC"
191 C
192 C ----- RESIDENT POINT DEFINITIONS ------
199 C     - USED RESIDENT POINTS & THE FIRST LINE IT OCCURRED IN -
200 C     - $LOC1,  IS NOT USED
202 C     - $LOC2,  IS NOT USED
204 C     - $LOC3,  is not used
206 C     - $LOC4,  is not used
208 C     - $LOC5,  is not used
210 C     - $LOC6,  is not used
212 C     - $LOC7,  IS NOT USED
214 C     - $LOC8,  IS NOT USED
216 C     - $LOC9,  IS NOT USED
218 C     - $LOC10, IS NOT USED
220 C     - $LOC11, IS NOT USED
222 C     - $LOC12, IS NOT USED
224 C     - $LOC13, IS NOT USED
226 C     - $LOC14, IS NOT USED
228 C     - $LOC15, IS NOT USED
230 C
232 C     - SVC, IS USED (2 TIME(S)) FOR SAF counter
234 C     - SECND1, IS USED (1 TIME(S)) FOR Ret VFD Ramp
236 C     - SECND2, NOT USED
238 C     - SECND3, NOT USED
240 C     - SECND4, NOT USED
242 C     - SECND5, NOT USED
244 C     - SECND6, NOT USED
246 C     - SECND7, NOT USED
397 C
398 C    --- CREATE AND RESET TIMERS ---
399 C
400 IF ("%X%SAF".NE. PRFON) THEN "%X%SVC" = 0
410 SAMPLE (1) IF("%X%SVC" .LT. 1000) THEN "%X%SVC" = "%X%SVC" + 1
420 IF ("%X%RAF".NE. PRFON) THEN SECND1 = 0
1491 C
1492 C ----- Dry Bulb ECONOMIZER CHANGE OVER -----
1493 C     - COMPARE THE OA & RA Dry Bulb TO TURN ON/OFF THE ECONOMIZER POINT -
1500 IF ("%X%OAT" .GT. "%X%RAT") THEN OFF("%X%ECM") ELSE ON("%X%ECM")
1698 C
1699 C     - HEAT / COOL CHANGE OVER -
1700 $LOC6 = "%X%HTS" + 1
1710 SAMPLE (60) DBSWIT (1,"%X%OAT", "%X%HTS",$LOC6,"%X%HTC"
1791 C
1792 C ----- CALCULATE K CFM -----
1793 C     - CALCULATE SUPPLY K CFM (ZERO IF NO FAN PROOF) -
1794 C     - CALCULATE RETURN K CFM (ZERO IF FAN IS OFF) -
```

FIG. 4a

```
1796 C      - CALCULATE RETURN K CFM DIFF. FOR OCC AND UNOCC -
1798 C            (INCLUDE EXHAUST FAN(S))
1799 C CAUTION ON GOING NEGATIVE WITH SQRT
1800 TIMAVG ($AVGSVP,1,5,"%X%SVP")
1810 "%X%SCF" = SQRT ($AVGSVP) * 4.005 * 49 * ("%X%SAF" .EQ. PRFON) * 1.0
1820 TIMAVG ($AVGRVP,1,5,"%X%RVP")
1840 "%X%RCF" = SQRT ($AVGRVP) * 4.005 * 42 * ("%X%RAF" .EQ. PRFON) * 1.0

1850 IF ("%X%MAD" .GT. 5) THEN "%X%RCS" = "%X%SCF" * 0.9  ELSE "%X%RCS" = "%X%SCF"

1971 C
1972 C ----- DECISION TREE--------
1973 C      - IF LIFE SAFETY SMOKE DETECTORS TRIPS THEN GO TO THAT BLOCK -

1974 C      - IF MECHANICAL SAFETY LOW TEMP DETECTOR TRIPS THEN GO TO THAT BLOCK -

1975 C
1976 C      --- ZONE MODE POINT FROM EVENT BUILDER/SCHEDULER ---
1977 C      - IF THE MODE/ZONE IS Occupied(1), Occ THEN GO TO THAT BLOCK -

1978 C      - IF THE MODE/ZONE IS Un-Occupied(0), UnOcc THEN GO TO THAT BLOCK -

1985 C      - IF THE MODE/ZONE IS Night Heating(8), NightHeat THEN GO TO THAT BLOCK 1989 C      - IF ALL VALIDATIONS FAIL, GO TO THE DEFAULT MODE, OCCUPIED -
1999 C
2010 IF ("%X%RSD" .EQ. ON) THEN GOTO 16000
2020 IF ("%X%LTD" .EQ. ON) THEN GOTO 17000
2030 IF ("%X%HIS" .EQ. ON) THEN GOTO 17000
2050 IF ("%X%ZON" .EQ. 1)  THEN GOTO 3000
2060 IF ("%X%ZON" .EQ. 0)  THEN GOTO 4000
2130 IF ("%X%ZON" .EQ. 8)  THEN GOTO 11000
2790 GOTO 3000
2915 C
2916 C ------ OCCUPIED MODE (1) ------
2917 C      - TURN ON THE Sup Air Fan -
2921 C      - TURN ON THE Ret Air Fan WITH A DELAY -
2935 C      - THE Sup Tmp SP WILL BE RESET FROM THE OA Temp -
2936 C      - MODULATE, HC Valve & MA Damper & CC Valve IN SEQUENCE
2937 C        WITHOUT OVERLAP TO MAINTAIN Sup Temp -
2990 C      - MODULATE THE CC Valve TO MAINTAIN SUPPLY SETPOINT -
2999 C
3000 ON ("%X%SAF")
3010 IF ("%X%SVC" .GT. 15) THEN ON ("%X%RAF") ELSE OFF ("%X%RAF")
3200 SAMPLE (60) TABLE ("%X%OAT", "%X%SAS", 40, 62, 55, 55)
3210 LOOP (0, "%X%SAT", "%X%VRT","%X%SAS","%X%P05","%X%I05",0,1,50,0,100,0)
3220 TABLE ("%X%VRT", "%X%HCV", 0, 100, 30, 0)
3230 IF ("%X%MAD" .LT. 5) THEN GOTO 3004
3003 C      - HW WINTER MODE (0) -

3004 LOOP (128, "%X%HET", "%X%HWH","%X%HWS","%X%P21","%X%I21",0,1,50,0,100,0)

3005 LOOP (128, "%X%SAT", "%X%HWF","%X%HLS","%X%P22","%X%I22",0,1,50,0,100,0)

3006 MIN  ("%X%HWH", "%X%HWL", "%X%HWF")
```

FIG. 4b

```
3002 GOTO 3600
3600 TABLE ("%X%VRT", "%X%MAE", 30, "%X%MAM", 59, 100)
3610 LOOP (128, "%X%MAT", "%X%MALE","%X%MAS","%X%P12","%X%I12",0,1,50,0,100,0)
3700 SET (0, "%X%CCV")
3790 GOTO 18000
3915 C
3916 C ----- Un-OCCUPIED MODE (0) -----
3917 C      - TURN ON THE Sup Air Fan -
3921 C      - TURN OFF THE Ret Air Fan -
3935 C      - GIVE THE Sup Tmp SP AN INITIAL VALUE ( deg) -
3936 C      - MODULATE, HC Valve & MA Damper & CC Valve IN SEQUENCE
3937 C      - OPEN THE HEATING VALVE -
3990 C      - CLOSE THE COOLING COIL -
3999 C
4000 ON ("%X%SAF")
4010 OFF ("%X%RAF")
4200 SET ("%X%SAS", "%X%SAS")
4220 SET (100, "%X%HCV")
4700 SET (0, "%X%CCV")
10833 C
10835 C ----- NIGHT HEATING (8) -----
10837 C      - TURN ON THE Sup Air Fan -
10845 C      - TURN ON THE Ret Air Fan -
10873 C      - GIVE THE Sup Tmp SP AN INITIAL VALUE ( deg) -
10875 C      - MODULATE, HC Valve & MA Damper & CC Valve IN SEQUENCE
10877 C      - OPEN THE HEATING VALVE -
10983 C      - CLOSE THE COOLING COIL -
10999 C
11000 ON ("%X%SAF")
11010 ON ("%X%RAF")
11200 SET ("%X%SAS", "%X%SAS")
11220 SET (100, "%X%HCV")
11700 SET (0, "%X%CCV")
11790 GOTO 18000
15915 C
15916 C ----- LIFE SAFETY (SMOKE CONTROL) -----
15917 C      - TURN ON THE Sup Air Fan -
15921 C      - TURN ON THE Ret Air Fan WITH A DELAY -
15935 C      - GIVE THE Sup Tmp SP AN INITIAL VALUE ( deg) -
15936 C      - MODULATE, HC Valve & MA Damper & CC Valve IN SEQUENCE
15937 C      - MODULATE THE HC Valve TO MAINTAIN Sup Temp -
15990 C      - CLOSE THE COOLING COIL -
15999 C
16000 OFF ("%X%SAF")
16010 OFF ("%X%RAF")
16200 SET ("%X%SAS", "%X%SAS")
16220 LOOP (0, "%X%SAT", "%X%HCV","%X%SAS","%X%P06","%X%I06",0,1,50,0,100,0)
16700 SET (0, "%X%CCV")
16790 GOTO 18000
```

FIG. 4c

```
16834 C
16836 C ----- MECHANICAL SAFETY (LOW TEMP & HIGH STATIC) -----
16838 C     - TURN OFF THE Sup Air Fan -
16846 C     - TURN OFF THE Ret Air Fan -
16874 C     - GIVE THE Sup Tmp SF AN INITIAL VALUE ( deg) -
16876 C     - MODULATE, HC Valve & MA Damper & CC Valve IN SEQUENCE
16878 C     - MODULATE THE HC Valve TO MAINTAIN Sup Temp -
16968 C     - CLOSE THE OA Damper TO OUTSIDE AIR -
16984 C     - CLOSE THE COOLING COIL -
16999 C
17000 OFF ("%X%SAF")
17010 OFF ("%X%RAF")
17200 SET ("%X%SAS", "%X%SAS")
17220 LOOP (0, "%X%MAT", "%X%HCV","%X%SAS","%X%P06","%X%I06",0,1,50,0,100,0)
17700 SET (0, "%X%CCV")
17790 GOTO 18000
17991 C
17992 C ----- MAINTAIN 2/3 STATIC PRESSURE -----
17993 C     - MODULATE TO MAINTAIN DOWN STREAM STATIC PRESSURE -
17994 C     - MODULATE TO MAINTAIN DISCHARGE STATIC PRESSURE -
17995 C     - RAMP SUPPLY FAN PROOF -
17996 C     - SELECT THE 2/3RD LOOP OR RAMP WHICHEVER IS LOWEST -
17999 C
18000 LOOP (128, "%X%SSP", "%X%SVD","%X%SSS","%X%P21","%X%I21",0,1,50,0,100,0)
18040 TABLE ("%X%SVC", "%X%SVR", 60, 0, 240, 100)
18060 MIN ("%X%SVD", "%X%SVL", "%X%SVV", "%X%SVR")
18491 C
18492 C ----- MAINTAIN Fan Tracking -----
18493 C     - MODULATE TO MAINTAIN DIFFERENTIAL -
18494 C     - RAMP RETURN FAN PROOF -
18495 C     - IF DAMPERS ARE OPEN THEN MODULATE VFDS ELSE TRACK
18496 C       VFDS TOGETHER (RUN THE RETURN FAN A LITTLE FASTER)-
18497 C     - SELECT THE  LOOP OR RAMP, WITCHEVER IS LOWEST -
18499 C
18500 LOOP (128, "%X%SCF", "%X%RVD","%X%RES","%X%P23","%X%I23",0,1,50,0,100,0)
18510 TABLE (SECND1, "%X%RVR" ,30 ,0, 210, 100)
18530 IF ("%X%MAD" .GT. 5) THEN MIN ("%X%RVD", "%X%RVL", "%X%RVR") ELSE "%X%RVD" =
      "%X%SVD"
19999 C
20000 GOTO 100
     0 Issues with delimiters in point names
```

| Do you want to list Physical Points? | | |
|---|---|---|
| Do you want to list Virtual Points? | | |
| Which delimiter do you want: | | x |

1 2 3 4 5 6 7 8 9

| Type in your point name: | . | . | . | . | . | . | . | . |

| ID | Descriptor | Type | Phy Virt | Key | | | | | | | | |
|---|---|---|---|---|---|---|---|---|---|---|---|---|
| 1 | econo IF/THEN/ELSE | AO | V | LE | BG.FLR13.AHU06.LE | | | | | | | |
| 2 | MA Lo Ctrl | AO | V | AL | BG.FLR13.AHU06.AL | | | | | | | |
| 3 | MA lo Ramp | AO | V | AV | BG.FLR13.AHU06.AV | | | | | | | |
| 4 | MA Seq Loop | AO | V | AE | BG.FLR13.AHU06.AE | | | | | | | |
| 5 | MA Dpr Min | AO | V | AM | BG.FLR13.AHU06.AM | | | | | | | |
| 6 | MA Tmp SP | AO | V | AS | BG.FLR13.AHU06.AS | | | | | | | |
| 7 | MA Inc Ramp | AO | V | AI | BG.FLR13.AHU06.AI | | | | | | | |
| 8 | Sup Tmp SP | AO | V | AS | BG.FLR13.AHU06.AS | | | | | | | |
| 9 | Heat Cc SP | AO | V | TS | BG.FLR13.AHU06.TS | | | | | | | |
| 10 | HeatCool CO | DO | V | TC | BG.FLR13.AHU06.TC | | | | | | | |
| 11 | Heat Whel SP | AO | V | WS | BG.FLR13.AHU06.WS | | | | | | | |
| 12 | HW Low SP | AO | V | LS | BG.FLR13.AHU06.LS | | | | | | | |
| 13 | HW Frost | AO | V | WF | BG.FLR13.AHU06.WF | | | | | | | |
| 14 | HW Loop | AO | V | WL | BG.FLR13.AHU06.WL | | | | | | | |
| 15 | Econo Mode | DO | V | CM | BG.FLR13.AHU06.CM | | | | | | | |
| 16 | Sup Loop Out | AO | V | RT | BG.FLR13.AHU06.RT | | | | | | | |
| 17 | Sup Stat Sp | AO | V | SS | BG.FLR13.AHU06.SS | | | | | | | |
| 18 | Sup KCFM | AO | V | CF | BG.FLR13.AHU06.CF | | | | | | | |
| 19 | Ret KCFM | AO | V | CF | BG.FLR13.AHU06.CF | | | | | | | |
| 20 | Ret KCFM SP | AO | V | CS | BG.FLR13.AHU06.CS | | | | | | | |
| 21 | Bld Press SP | AO | V | BS | BG.FLR13.AHU06.BS | | | | | | | |
| 22 | Sup VFD Loop | AO | V | VL | BG.FLR13.AHU06.VL | | | | | | | |
| 23 | Sup VFD Virt | AO | V | VV | BG.FLR13.AHU06.VV | | | | | | | |
| 24 | Ret VFD Loop | AO | V | VL | BG.FLR13.AHU06.VL | | | | | | | |
| 25 | Sup VFD Ramp | AO | V | VR | BG.FLR13.AHU06.VR | | | | | | | |
| 26 | Ret VFD Ramp | AO | V | VR | BG.FLR13.AHU06.VR | | | | | | | |
| 27 | Zone Mode | ENUM | V | ON | BG.FLR13.AHU06.ON | | | | | | | |
| 28 | SAF counter | AO | V | VC | BG.FLR13.AHU06.VC | | | | | | | |
| 29 | P Gain GAH | AO | V | 05 | BG.FLR13.AHU06.05 | | | | | | | |
| 30 | P Gain DUD | AO | V | 06 | BG.FLR13.AHU06.06 | | | | | | | |
| 31 | P Gain STD | AO | V | 12 | BG.FLR13.AHU06.12 | | | | | | | |
| 32 | P Gain MAC02 | AO | V | 21 | BG.FLR13.AHU06.21 | | | | | | | |
| 33 | P Gain MAD2 | AO | V | 22 | BG.FLR13.AHU06.22 | | | | | | | |
| 34 | P Gain MAF | AO | V | 23 | BG.FLR13.AHU06.23 | | | | | | | |
| 35 | I Gain GAH | AO | V | 05 | BG.FLR13.AHU06.05 | | | | | | | |
| 36 | I Gain DUD | AO | V | 06 | BG.FLR13.AHU06.06 | | | | | | | |
| 37 | I Gain STD | AO | V | 12 | BG.FLR13.AHU06.12 | | | | | | | |
| 38 | I Gain MAC02 | AO | V | 21 | BG.FLR13.AHU06.21 | | | | | | | |
| 39 | I Gain MAD2 | AO | V | 22 | BG.FLR13.AHU06.22 | | | | | | | |
| 40 | I Gain MAF | AO | V | 23 | BG.FLR13.AHU06.23 | | | | | | | |
| 41 | Sup Air Fan | DO | P | AF | BG.FLR13.AHU06.AF | | | | | | | |
| 42 | Ret Air Fan | DO | P | AF | BG.FLR13.AHU06.AF | | | | | | | |
| 43 | HC Valve | AO | P | CV | BG.FLR13.AHU06.CV | | | | | | | |
| 44 | Heat Wheel | AO | P | WH | BG.FLR13.AHU06.WH | | | | | | | |
| 45 | Run R Coil | AO | P | AC | BG.FLR13.AHU06.AC | | | | | | | |
| 46 | MA Damper | AO | P | AD | BG.FLR13.AHU06.AD | | | | | | | |
| 47 | CC Valve | AO | P | CV | BG.FLR13.AHU06.CV | | | | | | | |
| 48 | Sup VFD | AO | P | VD | BG.FLR13.AHU06.VD | | | | | | | |
| 49 | Ret VFD | AO | P | VD | BG.FLR13.AHU06.VD | | | | | | | |
| 50 | Sup Velocity | AO | P | VP | BG.FLR13.AHU06.VP | | | | | | | |
| 51 | Ret Velocity | AO | P | VP | BG.FLR13.AHU06.VP | | | | | | | |
| 52 | OutSide Temp | AO | P | AT | BG.FLR13.AHU06.AT | | | | | | | |
| 53 | Sup Temp | AO | P | AT | BG.FLR13.AHU06.AT | | | | | | | |
| 54 | H Wheel ETmp | AO | P | ET | BG.FLR13.AHU06.ET | | | | | | | |
| 55 | RA Temp | AO | P | AT | BG.FLR13.AHU06.AT | | | | | | | |
| 56 | SA Stat Pres | AO | P | SP | BG.FLR13.AHU06.SP | | | | | | | |
| 57 | Ret Smoke | DI | P | SD | BG.FLR13.AHU06.SD | | | | | | | |
| 58 | Lo Temp Det | DI | P | TD | BG.FLR13.AHU06.TD | | | | | | | |
| 59 | Hi Static Det | DI | P | IS | BG.FLR13.AHU06.IS | | | | | | | |
| 60 | Lo Static Det | DI | P | OS | BG.FLR13.AHU06.OS | | | | | | | |
| | | | | | BG.FLR13.AHU06. | | | | | | | |
| | | | | | BG.FLR13.AHU06. | | | | | | | |
| | | | | | BG.FLR13.AHU06. | | | | | | | |

FIG. 5

| SysName | UserName | Instance # | Obj Name | Description | PtType | Address | Virtual? | Eng. units | Slope | Intercept | COV limit | Dynamic |
|---|---|---|---|---|---|---|---|---|---|---|---|---|
| PAT.A1.MALE | PAT.A1.MAL | 4194303 | PAT.A1.MALE | #N/A | LAO | 0.0.0 | Yes | | | | 1 | No |
| PAT.A1.MAL | PAT.A1.MAL | 4194303 | PAT.A1.MAL | MA Lc Ctrl | LAO | 0.0.0 | Yes | PCT | 1 | 0 | 1 | No |
| PAT.A1.MAV | PAT.A1.MAV | 4194303 | PAT.A1.MAV | MA lc Ramp | LAO | 0.0.0 | Yes | PCT | 1 | 0 | 1 | No |
| PAT.A1.MAE | PAT.A1.MAE | 4194303 | PAT.A1.MAE | MA Seq Loop | LAO | 0.0.0 | Yes | PCT | 1 | 0 | 1 | No |
| PAT.A1.MAM | PAT.A1.MAM | 4194303 | PAT.A1.MAM | MA Dpr Min | LAO | 0.0.0 | Yes | PCT | 1 | 0 | 1 | No |
| PAT.A1.MAS | PAT.A1.MAS | 4194303 | PAT.A1.MAS | MA Tmp SP | LAO | 0.0.0 | Yes | PCT | | | | |
| PAT.A1.MAI | PAT.A1.MAI | 4194303 | PAT.A1.MAI | MA Inc Ramp | LAO | 0.0.0 | Yes | PCT | 1 | 0 | 1 | No |
| PAT.A1.SAS | PAT.A1.SAS | 4194303 | PAT.A1.SAS | Sup Tmp SP | LAO | 0.0.0 | Yes | Deg F | 1 | 0 | 1 | No |
| PAT.A1.OAT | PAT.A1.OAT | 4194303 | PAT.A1.OAT | OA Temp | LAO | 0.0.0 | Yes | Deg F | 1 | 0 | 1 | No |
| PAT.A1.ECM | PAT.A1.ECM | 4194303 | PAT.A1.ECM | Econo Mode | LAO | 0.0.0 | Yes | | 1 | 0 | 1 | No |
| PAT.A1.VRT | PAT.A1.VRT | 4194303 | PAT.A1.VRT | Sup Loop Out | LAO | 0.0.0 | Yes | PCT | 1 | 0 | 1 | No |
| PAT.A1.SSS | PAT.A1.SSS | 4194303 | PAT.A1.SSS | Sup Stat Sp | LAO | 0.0.0 | Yes | IN.WC | 1 | 0 | 2 | No |
| PAT.A1.SCF | PAT.A1.SCF | 4194303 | PAT.A1.SCF | Sup KCFM | LAO | 0.0.0 | Yes | K CFM | 1 | 0 | 0.5 | No |
| PAT.A1.RCF | PAT.A1.RCF | 4194303 | PAT.A1.RCF | Ret KCFM | LAO | 0.0.0 | Yes | K CFM | 1 | 0 | 10 | No |
| PAT.A1.RCS | PAT.A1.RCS | 4194303 | PAT.A1.RCS | Ret KCFM SP | LAO | 0.0.0 | Yes | K CFM | 1 | 0 | 10 | No |
| PAT.A1.RBS | PAT.A1.RBS | 4194303 | PAT.A1.RBS | Bld Press SP | LAO | 0.0.0 | Yes | Ps.PH | 1 | 0 | 11 | |
| PAT.A1.SVL | PAT.A1.SVL | 4194303 | PAT.A1.SVL | Sup VFD Loop | LAO | 0.0.0 | Yes | PCT | 1 | 0 | 0.1 | No |
| PAT.A1.SVV | PAT.A1.SVV | 4194303 | PAT.A1.SVV | Sup VFD Virt | LAO | 0.0.0 | Yes | PCT | 1 | 0 | 1 | No |
| PAT.A1.RVL | PAT.A1.RVL | 4194303 | PAT.A1.RVL | Ret VFD Loop | LAO | 0.0.0 | Yes | PCT | 1 | 0 | 1 | No |
| PAT.A1.SVR | PAT.A1.SVR | 4194303 | PAT.A1.SVR | Sup VFD Ramp | LAO | 0.0.0 | Yes | PCT | 1 | 0 | 1 | No |
| PAT.A1.RVR | PAT.A1.RVR | 4194303 | PAT.A1.RVR | Ret VFD Ramp | LAO | 0.0.0 | Yes | PCT | 1 | 0 | 1 | No |
| PAT.A1.ZON | PAT.A1.ZON | 4194303 | PAT.A1.ZON | Zone Mode | LAO | 0.0.0 | Yes | Mode | 1 | 0 | 1 | No |
| PAT.A1.SVC | PAT.A1.SVC | 4194303 | PAT.A1.SVC | SAF counter | LAO | 0.0.0 | Yes | Seconds | 1 | 0 | 1 | No |

/702
This Equipment Consists of:
This variable volume air handling unit consists of supply fan, return fan, supply heating control valve, mixed air section with outdoor air, exhaust air and return air dampers, supply cooling control valve, supply variable frequency drive, return variable frequency drive, /704
Operating Modes
The air handling unit is scheduled for automatic operation on a time of day basis for Occupied and Unoccupied modes. Within the Occupied mode, the system can enter the Warm-Up mode when the space temperature is below set point (72 Deg F adj.) or the Cool-Down mode when the space temperature is above set point. (72 Deg F adj.). The system stays in the Warm-Up or Cool-Down mode until the mode set point is satisfied. Within the Unoccupied mode, Night Heating is available when the space temperature drops below (72 Deg F adj.). Night Cooling is available when the space temperature rises above (72 Deg F adj.). The latest start time is the scheduled occupancy for the space.

The air handling unit operates in Occupied, Un-Occupied, Night Heating, Life Safety RSD, and Mechanical Safety HIS/LTD, as follows (All suggested set points and settings are adjustable.):

/706
Occupied
The supply fan starts up. The return fan start up with a delay. The supply temperature will be controlled by modulating these devices in sequence without overlap: supply heating control valve, mixed air section with outdoor air, exhaust air and return air dampers, CC Valve. When the economizer is off the OA damper will be positioned to minimum outside air flow.

/708
Unoccupied (Normal Off)
The supply fan starts up. The return fan shut down. The heating coil is opened. The cooling coil will close. During unoccupied mode the systems may enter into night heating if the space temperature drops below setpoint. The system may enter into night cooling if the space temperature rises above setpoint.

/710
Warm-Up
The supply fan starts up. The return fan start up with a delay. The supply heating control valve will modulate to maintain setpoint. The mixed air section with outdoor air, exhaust air and return air dampers are positioned closed to outside air. The cooling coil will close. The system is prevented from entering the Warm-Up mode more than once per day.

/712
Cool-Down
The supply fan starts up. The return fan start up with a delay. The supply air temperature setpoint will be set at 55 deg. The heating valve is closed. The supply cooling control valve will modulate to maintain setpoint. The system is prevented from entering the Cool-Down mode more than once per day.

/714
Night Heating
The supply fan starts up. The return fan start up. The heating coil is opened. The cooling coil will close. When the space temperature rises above setpoint the system will return back to unoccupied mode.

FIG. 7a

Supply Duct and Building Pressurization Control /716

After the supply fan proves operation the supply variable frequency drive will modulate to maintain the 2/3rd static setpoint. (Setpoint). The supply variable frequency drive will be reset if discharge static goes above the discharge setpoint. (Setpoint). After the return fan proves operation the return variable frequency drive will modulate to maintain Occ setpoint differential of (Setpoint). The fans will ramp up slowly on startup. If any fan loses proof their respective variable frequency drive will shut down.

Safety (Life) 718

With a trip of the hardwired safeties, smoke detector in the supply air stream, smoke detector in the return air stream, will alarm and the system will shut down.

The shut down sequence will be: The supply fan shuts down. The return fan shut down. The supply air temperature setpoint will be set at 55 deg. The supply heating control valve will modulate to maintain setpoint. The mixed air section with outdoor air, exhaust air and return air dampers are positioned closed to outside air. The cooling coil will close.

Safety (Mechanical) 720

With a trip of the hardwired safeties, discharge high static cutout, low temperature detector will alarm and the system will shut down.

The supply fan shuts down. The return fan shut down. The supply heating control valve will modulate to maintain setpoint. The mixed air section with outdoor air, exhaust air and return air dampers are positioned closed to outside air. The cooling coil will close. The safeties will require a manual reset to return the system to operate normally.

Current switches are installed on the load side of the supply and return fan VFDs. The DDC system uses the switches to confirm the fans are in the desired state (i.e. on or off) and generates an alarm if status deviates from DDC start/stop control. The DDC system generates a VFD trouble alarm independent from the fan status.

FIG. 7b

Verify each listed item in reference to the Sequence of Operation.                    <--800

Job: First National Bank,  B250-$$$$
       PM: Point Transfer
       Spec: Head Tech

| ID | Line # | Item to validate | Initials |
|---|---|---|---|
| 1 | 10 | ☐ Update the customer's name | |
| 2 | 12 | ☐ Update the customer's name | |
| 3 | 130 | ☐ Update the network OA Temperature point name | |
| 4 | 400 | ☐ Adjust the timers to better meet system timing needs. | |
| 5 | 1492 | ----- Dry Bulb ECONOMIZER CHANGE OVER ----- | |
| 6 | 1500 | ☐ Make sure that the OA Temp is triggering with the correct inside temp sensor ("%X%RAT") for econo. | |
| 7 | 1792 | ----- CALCULATE K CFM ----- | |
| 8 | 1800 | ☐ Adjust the sample and time needed for proper noise reduction (1,5). | |
| 9 | 1810 | ☐ Adjust the dimensions of the ductwork (49). And the FloCo (1.0) | |
| 10 | 1820 | ☐ Adjust the sample and time need for proper noise reduction (1,5). | |
| 11 | 1840 | ☐ Adjust the dimensions of the ductwork (42). And the FloCo (1.0) | |
| 12 | 1850 | ☐ Adjust Fan Differential (0.9=90%). Adjust for Exhaust KCFM (1.5). | |
| 13 | 1972 | ----- DECISION TREE ----- | |
| 14 | 1977 | ☐ Adjust the start time in schedule for Occ mode | |
| 15 | 1978 | ☐ Adjust the start time in schedule for UnOcc mode | |
| 16 | 1985 | ☐ Adjust the temperature setpoint in schedule for NightHeat mode | |
| 17 | 2790 | ☐ Adjust the line number (GOTO 3000) to go to the default mode | |
| 18 | 2916 | ----- OCCUPIED MODE (1) ----- | |
| 19 | 3010 | ☐ Adjust the time delay for startup, "%X%RF2" (25sec) | |
| 20 | 3220 | ☐ Adjust the pump dead band (2). | |
| 21 | 3916 | ----- Un-OCCUPIED MODE (0) ----- | |
| 22 | 10835 | ----- NIGHT HEATING (8) ----- | |
| 23 | 15916 | ----- LIFE SAFETY (SMOKE CONTROL) ----- | |
| 24 | 16836 | ----- MECHANICAL SAFETY (LOW TEMP & HIGH STATIC) ----- | |
| 25 | 17992 | ----- MAINTAIN 2/3 STATIPRESSURE ----- | |
| 26 | 18000 | ☐ Adjust timing and gains for the Loop. Determine the proper setpoint. ("%X%SSS", AO) | |
| 27 | 18492 | ----- MAINTAIN Fan Tracking ----- | |
| 28 | 18500 | ☐ Adjust timing and gains for the Loop. Determine the proper setpoint. ("%X%RBS", AO) | |
| 29 | 19999 | Verify networked points are resolved, "%X%OAT" | |
| 30 | Message | ----- ERROR MESSAGES ----- | |

FIG. 8

Sequence of Operation Acceptance/ Change Request Form ←--900
Job Name:   Bank                                    Equipment tag: AHU 01.  5th floor
Commissioning Specialist: _____
Project Manager: _____
*Document all function that work in accordance to the designed requirements.*
*Document any requests for changes. All changes must be approved by the Siemens Project Manger before work can commence.*

\*\* Equipment \*\*
This equipment consists of a variable air volume system with:
    ☐ supply fan
    ☐ return fan
    ☐ supply heating control valve
    ☐ mixed air section with outdoor air, exhaust air and return air dampers
    ☐ supply cooling control valve
    ☐ supply variable frequency drive
    ☐ return variable frequency drive

```
For above sequence
Initials: _____  Change: ☐   Accepted: ☐   Date: _____/_____/_____
Comments:

Change Request:

Customer Name:                       Customer Signature:
```

\*\* Operating Modes \*\*
Step: Verify schedule by either ☐ adjusting schedule or ☐ adjust the time clock to witness the changes stated below.  ☐ Adjust setpoints to witness changes in control strategies.
  ☐ Place the system into un-occupied   Adjust the setpoint to verify that the system will enter into Occ.
  ☐ Place the system into occupied.  Adjust the setpoint to verify that the system will enter into UnOcc.

☐ Place the system into un-occupied. Adjust the setpoint to verify that the system will enter into NightHeat.
  ☐ Place the system into occupied. Trip the safety to verify that the system will follow the proper shut down procedure for Safe.L.
  ☐ Place the system into occupied. Trip the safety to verify that the system will follow the proper shut down procedure for Safe.M
For above sequence
Initials: _____  Change: ☐   Accepted: ☐   Date: _____/_____/_____
Comments:

Change Request:

Customer Name:                       Customer Signature:

FIG. 9a

\*\* Occupied Mode (1) \*\*

Step: Change the schedule to force the system into Un-Occupied Mode (0). Change the time and date to cause the system to go into ,Occupied Mode (1) mode. Verify that the system will operate as follows:

☐ The supply fan turns On.
    ☐ The return fan turns On (delay).
    ☐ The supply air temperature setpoint will be reset as: When OAT=40 Then SAT=62 and when OAT=55 then SAT=55
        ☐ The following equipment will modulate in sequence to maintain Sup Temp.
            ☐ The supply heating control valve will modulate in sequence.
            ☐ The mixed air section with outdoor air, exhaust air and return air dampers will modulate in sequence.
            ☐ The CC Valve will modulate in sequence.
    ☐ After the supply fan proves operation their VFD will modulate to maintain the 2/3rd static.
    ☐ After the supply fan proves operation the their VFD will be reset if discharge static goes above setpoint. (2.5")

| For above sequence |
| --- |
| Initials: _____ Change: ☐ Accepted: ☐ Date: ___/___/___ |
| Comments: |
| |
| Change Request: |
| |
| |
| Customer Name:            Customer Signature: |

\*\* Un-Occupied Mode (0) \*\*

Step: Change the schedule to force the system into Occupied Mode (1). Change the time and date to cause the system to go into Un-Occupied Mode (0). Verify that the system will operate as:

☐ The supply fan will turn on
    ☐ The return fan will turn off
    ☐ The supply heating control valve will turn open
    ☐ The MA Seq Loop will NA
    ☐ The mixed air section with outdoor air, exhaust air and return air dampers will Close
    ☐ The MA ramp will NA
    ☐ The CC loop will NA
    ☐ The CD Loop Out will NA
    ☐ The supply cooling control valve will Close
    ☐ The supply variable frequency drive will Modulate
    ☐ The Virt for Dis Stat Control will Modulate
    ☐ The return variable frequency drive will Modulate

FIG. 9b

For above sequence
Initials: _____ Change: ☐ Accepted: ☐ Date: ____/____/____
Comments:

Change Request:

Customer Name:                              Customer Signature:

..
\*\* Morn. Warm-Up Mode (6) \*\*
Step: Change the schedule to force the system into Un-Occupied Mode (0). Change the time and date to cause the system to go into Morn. Warm-Up Mode (6). Verify that the system will operate as:
    ☐ The supply fan turns On.
    ☐ The return fan turns On (delay).
    ☐ The supply heating control valve will modulate to maintain setpoint.
    ☐ The mixed air section with outdoor air, exhaust air and return air dampers are positioned closed to outside air.
    ☐ The cooling coil will close.
For above sequence
Initials: _____ Change: ☐ Accepted: ☐ Date: ____/____/____
Comments:

Change Request:

Customer Name:                              Customer Signature:

..
\*\* Morn. Cool-Down Mode (7) \*\*
Step: Change the schedule to force the system into Un-Occupied Mode (0). Change the time and date to cause the system to go into Morn. Cool-Down Mode (7). Verify that the system will operate as:
    ☐ The supply fan turns On.
    ☐ The return fan turns On (delay).
    ☐ The supply air temperature setpoint will be set at 55 deg.
    ☐ The supply heating control valve will Close.
    ☐ The supply cooling control valve will modulate to maintain setpoint.
    ☐ After the supply fan proves operation their VFD will modulate to maintain the 2/3rd static.

FIG. 9c

```
For above sequence
Initials: _____   Change: ☐   Accepted: ☐   Date: ____/____/____
Comments:

Change Request:

Customer Name:                          Customer Signature:
```

\*\* Night Heating Mode (8) \*\*
Step: Change the schedule to force the system into Un-Occupied Mode (0). Change the time and date to cause the system to go into Night Heating Mode (8). Verify that the system will operate as:

☐ The supply fan turns On.
☐ The return fan turns .
☐ The supply heating control valve will Open.
☐ The mixed air section with outdoor air, exhaust air and return air dampers are positioned closed to outside air.
☐ The cooling coil will close.

For above sequence
Initials: _____   Change: ☐   Accepted: ☐   Date: ____/____/____
Comments:

Change Request:

Customer Name:                          Customer Signature:

\*\* Night Cooling Mode (9) \*\*
Step: Change the schedule to force the system into Un-Occupied Mode (0). Change the time and date to cause the system to go into Night Cooling Mode (9). Verify that the system will operate as:

☐ The supply fan turns On.
☐ The return fan turns .
☐ The supply heating control valve will Close.
☐ When the economizer is turned on the mixing dampers will be positioned to 100% outside air. When the economizer is off the mixing dampers will be positioned to 100% recirculation.

☐ The supply cooling control valve will modulate to maintain setpoint.

FIG. 9d

| For above sequence | | | |
|---|---|---|---|
| Initials: _____ Change: ☐ Accepted: ☐ Date: ___/___/___ | | | |
| Comments: | | | |
| | | | |
| Change Request: | | | |
| | | | |
| Customer Name: | | Customer Signature: | |

Occ

Step: Command the operation mode to occupied mode (1). Change static setpoint verify that the system will operate as:

Supply Duct and Building Pressurization Control

Err # Func-55-14 for Hwt24

☐ After the return fan proves operation the their VFD will modulate to maintain positive Occ.

For above sequence
Initials: _____ Change: ☐ Accepted: ☐ Date: ___/___/___
Comments:

Change Request:

Customer Name:                    Customer Signature:

Safety RSD Mode (12)

Step: Change the schedule to force the system into Occupied Mode (1). Trip a safety to cause the system to go into Safety RSD Mode (12). Verify that the system will operate as:

☐ The supply fan turns Off.
☐ The return fan turns.
☐ The supply air temperature setpoint will be set at 55 deg.
☐ The supply heating control valve will modulate to maintain setpoint.
☐ The mixed air section with outdoor air, exhaust air and return air dampers are positioned closed to outside air.
☐ The cooling coil will close.

| For above sequence | | | |
|---|---|---|---|
| Initials: _____ Change: ☐ Accepted: ☐ Date: ___/___/___ | | | |
| Comments: | | | |
| | | | |
| Change Request: | | | |
| | | | |
| Customer Name: | | Customer Signature: | |

FIG. 9e

Safety HIS/LTD Mode (13) 
Step: Change the schedule to force the system into Occupied Mode (1). Trip a safety to cause the system to go into Safety HIS/LTD Mode (13). Verify that the system will operate as:

☐ The supply fan turns Off.
☐ The return fan turns .
☐ The supply heating control valve will modulate to maintain setpoint.
☐ The mixed air section with outdoor air, exhaust air and return air dampers are positioned closed to outside air.
☐ The cooling coil will close.

| For above sequence | | | |
|---|---|---|---|
| Initials: _____ Change: ☐ Accepted: ☐ Date: ___/___/___ | | | |
| Comments: | | | |
| | | | |
| Change Request: | | | |
| | | | |
| Customer Name: | | Customer Signature: | |

..
 Wrap-up

FIG. 9f

AUTOMATED ENGINEERING OF BUILDING AUTOMATION SYSTEMS

TECHNICAL FIELD

The present invention relates generally to building automation system and more particularly to the engineering of heating, ventilating, and air conditioning systems for buildings.

BACKGROUND

Most modern buildings are built with heating, ventilating, and air conditioning (HVAC) systems that have many sensors, fans, values, and actuators. Many of these devices are controlled by a microcontroller or microprocessor located in field panels. The programming of each panel is often unique based upon the different devices coupled to the panel. The initial provisioning of a HVAC system takes multiple hours to layout the design, develop the programming for the panels and other programmable devices, program the devices, tweak the devices, and test the devices and programs. It takes many hours, if not days to properly commission an HVAC system and takes many months to properly train technicians how configure and program HVAC systems. Thus, the commissioning and debugging of an HVAC system is often part of an estimate for selling the components that make up the system.

Current approaches at automating configuration of HVAC systems and other systems have mixed results with all of them failing to provide complete configurations. This failing is due to the two-dimensional configuration approaches that have been employed. Two-dimensional approaches only have knowledge of potential elements and parameters of a system, such as an HVAC system. But in practice additional dependencies and interactions are considerations that have to be taken into account when programming HVAC systems.

In view of the foregoing, there is an ongoing need for systems, apparatuses and methods for reducing the commissioning time of an HVAC system while reducing human errors that occur when commissioning the HVAC system while considering additional provisioning interactions that are not possible in a two-dimensional approach.

SUMMARY

In view of the above, an approach for an automated engineering of building automation systems is provided. A user identifies a plurality of hardware elements of a HVAC system to the automated engineering of building automation systems application (AEBASA) controlled by a processor in a processor controlled device. The user also may identify a plurality of operational modes and non-device dependent parameters for a HVAC system to the AEBASA. A database of element characteristics associated with the plurality of hardware elements is accessed by the AEBASA. The database contains multi associational data model and identifies additional dependencies and associations beyond element and parameters of a system. A program adapted to be executed by a controller in an HVAC system is generated by the AEBASA in response to the identification of the plurality of hardware elements, operational modes, non-device dependent parameters, and dependencies are generated. In addition to the program, a points list of a plurality of points used in the program that are associated with the HVAC system by the AEBASA in response to the generation of the program is created, a cross-reference points list that cross references the plurality of point names used in the program with associated HVAC system point names by the AEBASA is created, a description of the plurality of operational modes in response to the generating of the program by the AEBASA is created, a commissioning list by the AEBASA based upon the program is created; and functional test set is created by the AEBASA based upon the program.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

FIGS. 4a-d are a printout of control language instructions, i.e. Power Process Control Language (PPCL), generated by the processor controlled device of FIG. 1 for the HVAC building implementation of FIG. 2 in accordance with an example implementation of the invention.

FIG. 5 is a points list employed by the processor controlled device of FIG. 1 located in the HVAC building implementation in accordance with an example implementation.

FIGS. 6a-c are a point cross reference list generated by the processor controlled device of FIG. 1 in accordance with an example implementation.

FIGS. 7a and 7b are a sequence of operation (SOO) list generated by the processor control device of FIG. 1 in accordance with an example implementation of the invention.

FIG. 8 is an illustration of a commissioning list is generated by the AEBASA executed by the processor control device of FIG. 1 in accordance with an example implementation of the invention.

FIGS. 9a-f is a functional test set generated by the processor control device of FIG. 1 for testing the PPCL of FIG. 4 in accordance with an example implementation of the invention.

DETAILED DESCRIPTION

As used herein, an approach is described for provisioning a plurality of controllers in a HVAC system that control a plurality of points by generating Power Process Control Language (PPCL) program and associated information automatically in response to being prompted for initial configuration information.

Figure 1:
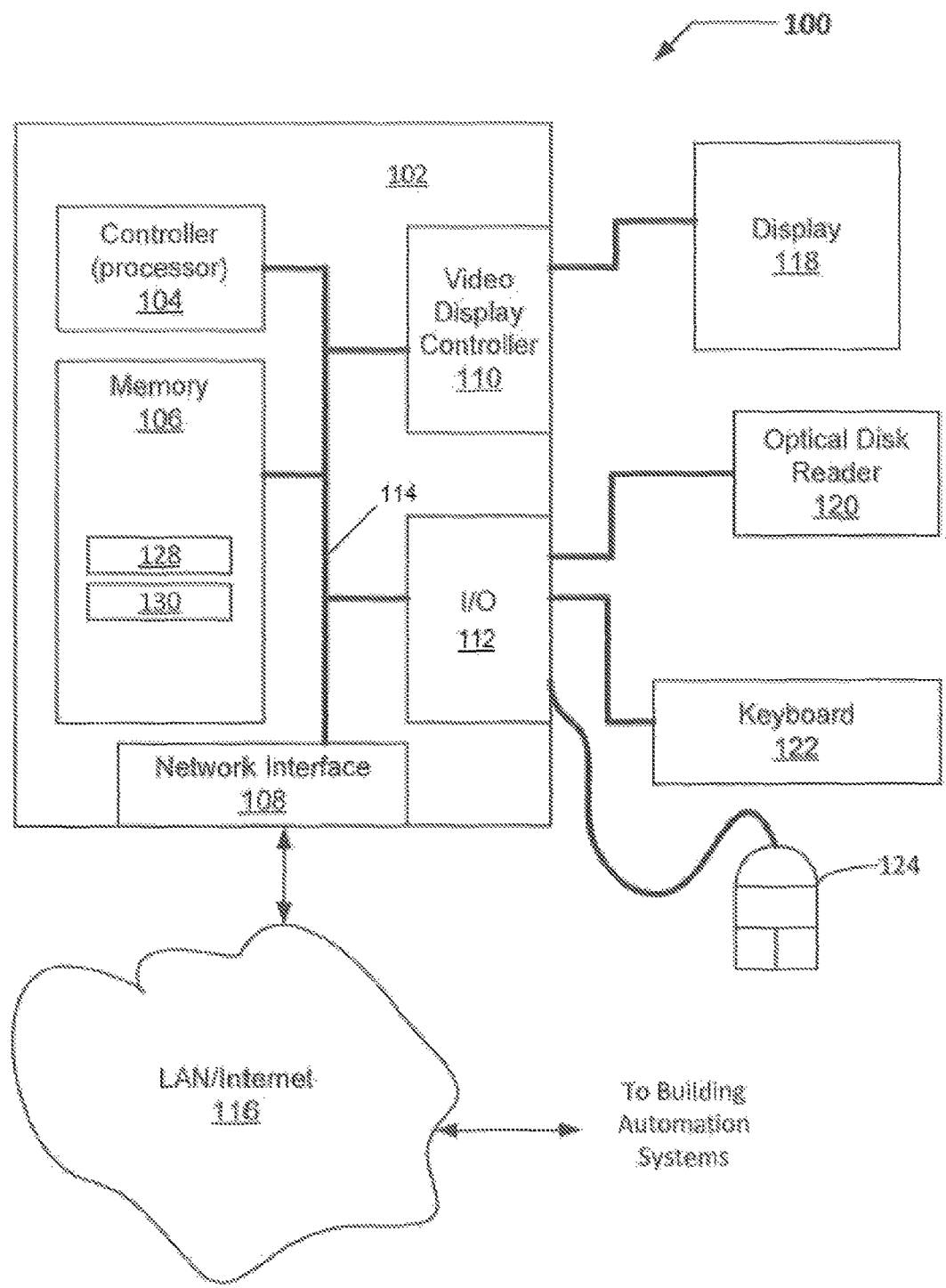
FIG. 1 is an illustration of a processor controlled device that is able to take a plurality of points input and generates control instructions for HVAC panels in accordance with an example implementation of the invention.

Turning to FIG. 1, an illustration 100 of a processor controlled device that is able to take a plurality of points input and generates control instructions for HVAC panels in accordance with an example implementation of the invention is depicted. The processor controlled device 102 may have a controller 104 (processor) coupled to a memory 106, network interface 108, video controller 110, and input/output (I/O) interface 112 by address/data bus 114. The network interface 108 may couple the processor controlled device 102 to a network, such as one or more local area networks (LANs)/internet 116, or a proprietary building automation system network. The connection to the LANs/internet 116 may be wired or wireless (such as 802.11g or 802.11n). The video controller 110 may be coupled to one or more displays, such as display 118. The display is typically a digital video displays, such as HD televisions or VGA computer displays. The I/O interface 112 may be coupled to a keyboard 122, optical disk reader 120, and mouse 124.

The controller 104 may execute instructions that may be stored in memory 106 that facilitate the operation of the processor controlled device 102. The memory 106 may be logically or physically split into an operational memory 128 that provide operational instructions for the processor controlled device 102 and an application memory 130 that may have one or more applications and/or databases, such as a multi-associational data model. In other implementations, the application memory 130 may be dedicated to one application.

Figure 2:
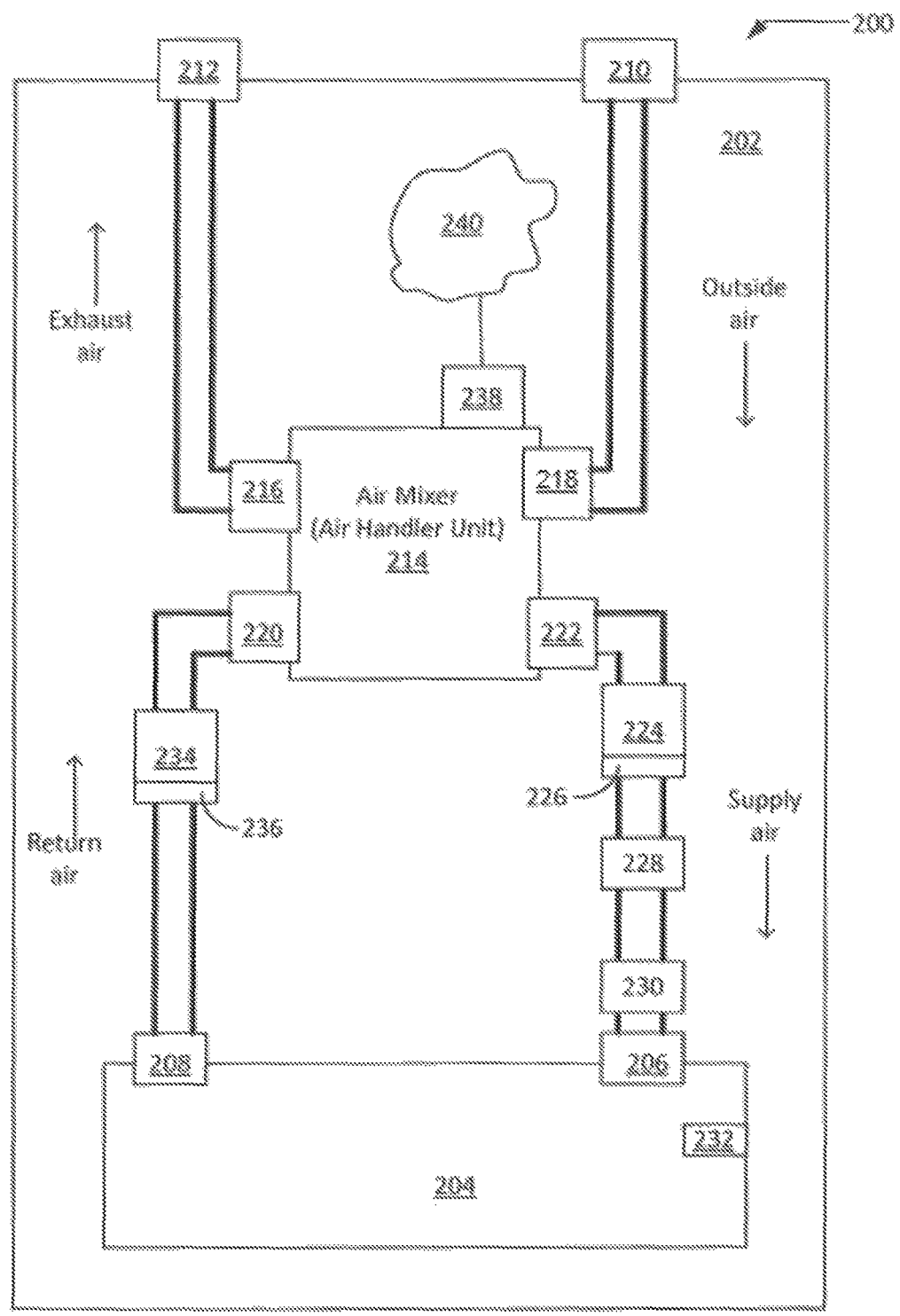
FIG. 2 is a graphical illustration of a HVAC building implementation in accordance with and example implementation of the invention.

In FIG. 2, a graphical illustration of a HVAC building implementation 200 in accordance with and example implementation of the invention is depicted. A building 202 with a room 204 has a supply air vent 206 and return air vent 208. Outside air is brought into the building via an outside inlet vent 210 and exhausted via outside exhaust vent 212. An air mixer 214 may have an exhaust air damper 216, outdoor air damper 218, return air damper 220, and supply air damper 222. A supply fan 224 may aid in moving the supply air and have a supply variable frequency drive 226. A heating supply control valve 228 may control the heating of the supply air and similarly a supply air cooling valve 230 may control the cooling of the supply air, and thermostat 232 may also be present in room 204. Return air exits the room 204 via the return air vent 208 and may be aided by return fan 234 that may be controlled by return variable frequency drive 236. The return air enters the air mixer 214 via return air damper 220. All the devices may be controlled by one or more field panels, such as panel 238, that control the different elements of the HVAC system.

The field panel may be directly or indirectly coupled to a building's telecommunication network 240 and/or the internet. The field panel may have one or microcontrollers that are programmed to operate the different components of the HVAC system.

Figure 3:
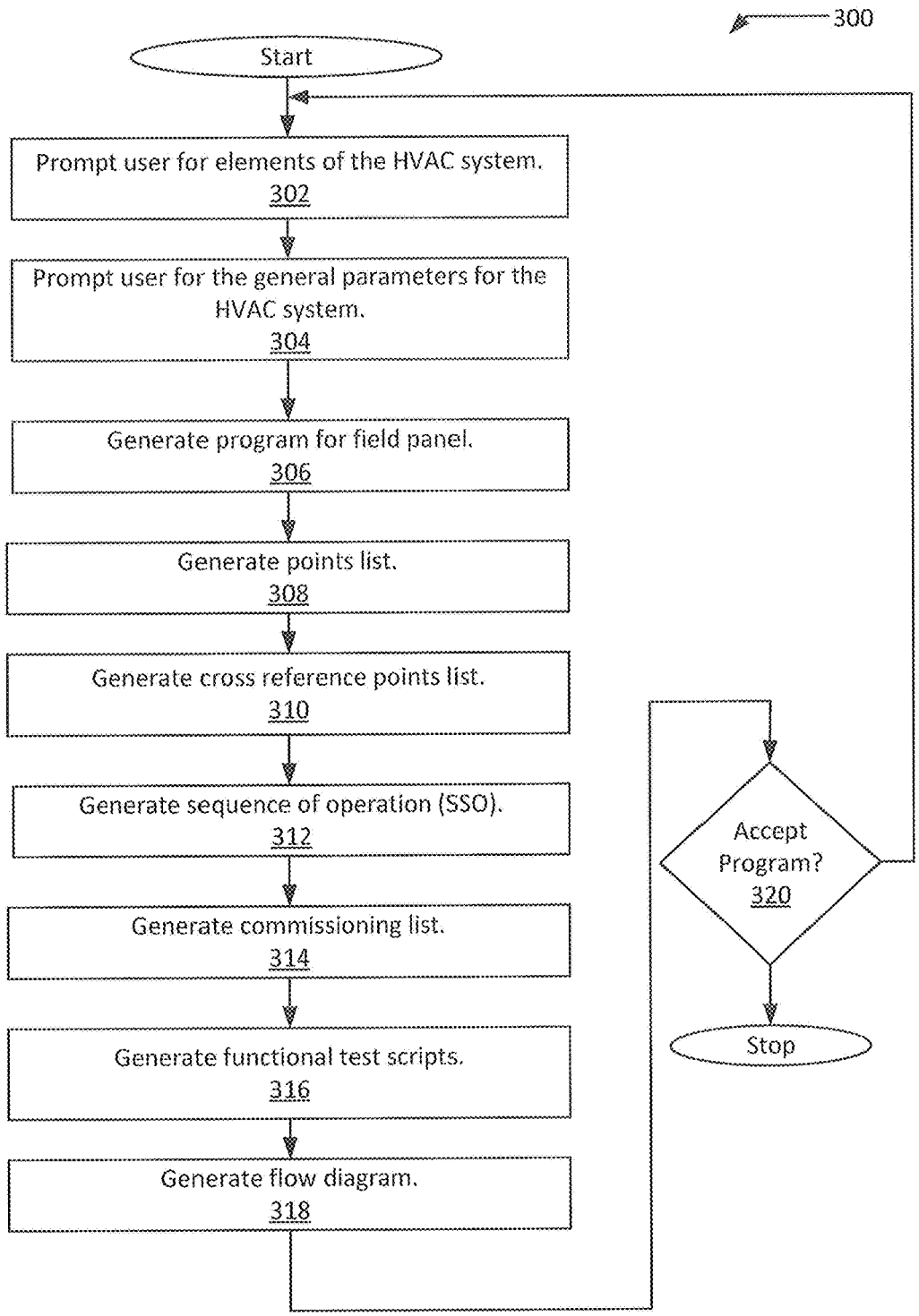
FIG. 3 is an illustration of a flow diagram of an approach for generation of field panel programming for the HVAC system of FIG. 2 according to an example implementation of the invention.

Turning to FIG. 3, flow diagram 300 of an approach for generation of field panel programming for the HVAC system 200 of FIG. 2 according to an example implementation of the invention is illustrated. A user at the processor control device of FIG. 1 executes a plurality of instructions for the automated engineering of building automation systems application (AEBASA). The application then prompts the user via display 118 to respond to a plurality of questions associated elements of the HVAC system via an input device, such as keyboard and mouse 120 & 122, in step 302.

In some implementations, pull down menus of HVAC system elements may be presented to a user, such as heat exchanges, fans, thermostats, dampers, air conditioners, etc. . . . Once the hardware configuration of the HVAC system has been identified to the AEBASA, the user may be prompted for parameters for the HVAC system. A database may reside in memory or otherwise be accessible (i.e. via the cloud) that predefines HVAC system elements and their associated elements. In step 304, the user may be prompted to configure the operating modes and/or parameters associated with the different elements of the HVAC system and general operating parameters. The parameters for elements of the HVAC system may be size of equipment, type of equipment (electric/gas/solar) to give but a few examples. The general operating parameters may include occupancy time, temperature when occupied or afterhours, outside temperature, humidity to give but a few examples. In other implementations, data may be filled out in forms that are machine readable, such as a spreadsheet, rather than prompted for by the AEBASA.

Since the AEBASA knows the hardware and parameters from the user entered data and the database, a program (PPCL program for execution by controllers) may be generated in step 306, points list in step 308, points transfer list in step 310, sequence of operation (SSO) in step 312, commissioning list 314, functional test scripts 316, and a flow diagram of the operation of the generated PPCL in step 318. If the resulting PPCL is acceptable by the user (often determined by examining the generated flow diagram), processing ends after step 320. Otherwise a user may be prompted to change the entered data starting at step 302 again.

For example, a user may enter in the following HVAC system elements for a variable air volume HVAC system: supply fan 224, return fan 234, supply heating control valve 228, mixed air section 214 with outdoor air 218, exhaust air 216, and return air dampers 220, supply cooling control valve 230, supply variable frequency drive 226, return variable frequency drive 236.

The variable air volume HVAC system 200 may have the following operating modes or parameters:
Step: Verify schedule by either; adjusting schedule, or adjust the time clock, to witness the changes stated below.
  Adjust setpoints to witness changes in control strategies.
  Place the system into un-occupied. Adjust the setpoint to verify that the system will enter into occupancy.
  Place the system into occupied. Adjust the setpoint to verify that the system will enter into unoccupied.
  Place the system into un-occupied. Adjust the setpoint to verify that the system will enter into Night Heat.
  Place the system into occupied. Trip the safety to verify that the system will follow the proper shut down procedure for "Safe Life" shutdown.
  Place the system into occupied. Trip the safety to verify that the system will follow the proper shut down procedure for "Safe Mechanical" shutdown.
In occupied mode(1):
Step: Change the schedule to force the system into Un-Occupied Mode (0). Change the time and date to cause the system to go into, Occupied Mode (1) mode. Verify that the system will operate as follows:
  The supply fan turns On.
  The return fan turns On (delay).

The supply air temperature setpoint will be reset as:
When OAT=40 Then SAT=62 and when OAT=55 then SAT=55

The following equipment will modulate in sequence to maintain Sup Temp.

The supply heating control valve will modulate in sequence.

The mixed air section with outdoor air, exhaust air and return air dampers will modulate in sequence.

The CC Valve will modulate in sequence.

After the supply fan proves operation their VFD will modulate to maintain the ⅔rd static.

After the supply fan proves operation, their VFD will be reset if discharge static goes above setpoint. (2.5")

In Un-occupied Mode (0):
Step: Change the schedule to force the system into Occupied Mode (1). Change the time and date to cause the system to go into Un-Occupied Mode (0). Verify that the system will operate as:
The supply fan will turn on
The return fan will turn off
The supply heating control valve will turn open
The MA Seq Loop will NA
The mixed air section with outdoor air, exhaust air and return air dampers will Close
The MA ramp will NA
The CC loop will NA
The CD Loop Out will NA
The supply cooling control valve will Close
The supply variable frequency drive will Modulate
The Virt for Dis Stat Control will Modulate
The return variable frequency drive will Modulate In Morning Warm-up Mode(6):
Step: Change the schedule to force the system into Un-Occupied Mode (0). Change the time and date to cause the system to go into Morn. Warm-Up Mode (6). Verify that the system will operate as:
The supply fan turns On.
The return fan turns On (delay).
The supply heating control valve will modulate to maintain setpoint.
The mixed air section with outdoor air, exhaust air and return air dampers are positioned closed to outside air.
The cooling coil will close.

In Morning Cool-Down Mode(7):
Step: Change the schedule to force the system into Un-Occupied Mode (0). Change the time and date to cause the system to go into Morn. Cool-Down Mode (7).
The supply fan turns On.
The return fan turns On (delay).
The supply air temperature setpoint will be set at 55 deg.
The supply heating control valve will Close.
The supply cooling control valve will modulate to maintain setpoint.
After the supply fan proves operation their VFD will modulate to maintain the ⅔rd static.

In Night Heating Mode(8):
Step: Change the schedule to force the system into Un-Occupied Mode (0). Change the time and date to cause the system to go into Night Heating Mode (8).
The supply fan turns on.
The return fan turns on.
The supply heating control valve will Open.
The mixed air section with outdoor air, exhaust air and return air dampers are positioned closed to outside air.
The cooling coil will close.

In Night Cooling Mode(9):
Step: Change the schedule to force the system into Un-Occupied Mode (0). Change the time and date to cause the system to go into Night Cooling Mode (9).
The supply fan turns On.
The return fan turns on.
The supply heating control valve will Close.
When the economizer is turned on the mixing dampers will be positioned to 100% outside air. When the economizer is off the mixing dampers will be positioned to 100% recirculation.

In Safety RSD Mode(12):
Step: Change the schedule to force the system into Occupied Mode (1). Trip a safety to cause the system to go into Safety RSD Mode (12).
The supply fan turns off.
The return fan turns off.
The supply air temperature setpoint will be set at 55 deg.
The supply heating control valve will modulate to maintain setpoint.
The mixed air section with outdoor air, exhaust air and return air dampers are positioned closed to outside air.
The cooling coil will close.

In Safety HIS/LTD Mode(13):
Step: Change the schedule to force the system into Occupied Mode (1). Trip a safety to cause the system to go into Safety HIS/LTD Mode (13).
The supply fan turns off.
The return fan turns off.
The supply heating control valve will modulate to maintain setpoint.
The mixed air section with outdoor air, exhaust air and return air dampers are positioned closed to outside air.
The cooling coil will close.

In FIGS. 4a-d, a printout of control language instructions, i.e. Power Process Control Language (PPCL), 400 generated by the processor controlled device 100 of FIG. 1 for the HVAC building implementation 200 of FIG. 2 in accordance with an example implementation of the invention is provided. The PPCL 400 is generated from the input associated with the above. PPCL 400 is in a format with comments that may be downloaded or otherwise loaded into a field control panel, such as field control panel 238. The addition of comments makes the PPCL 400 generated by the AEBASA more readable/understandable and maintainable, thus reducing the effort it takes a service technician to adjust the programming of field panels and HVAC systems in the field.

Turning to FIG. 5, a points list 500 employed by the processor controlled device of FIG. 1 associated with the HVAC building implementation of FIG. 3 in accordance with an example implementation is provided. The points of the HVAC system are the elements (virtual and real) that are actually controlled by the microcontroller in the panel. It is noted that the Point's name/description, building, floor, and air handler are specified in the point's name. Thus the list provides a ready reference between the system names (i.e. BG.FLR13.AHU06.AF) and device description/name (i.e. Sup Air Fan). The points in the point list are typically used in the PPCL 400 of FIG. 4 and further aid in reading the PPCL 400.

Figure 6B:
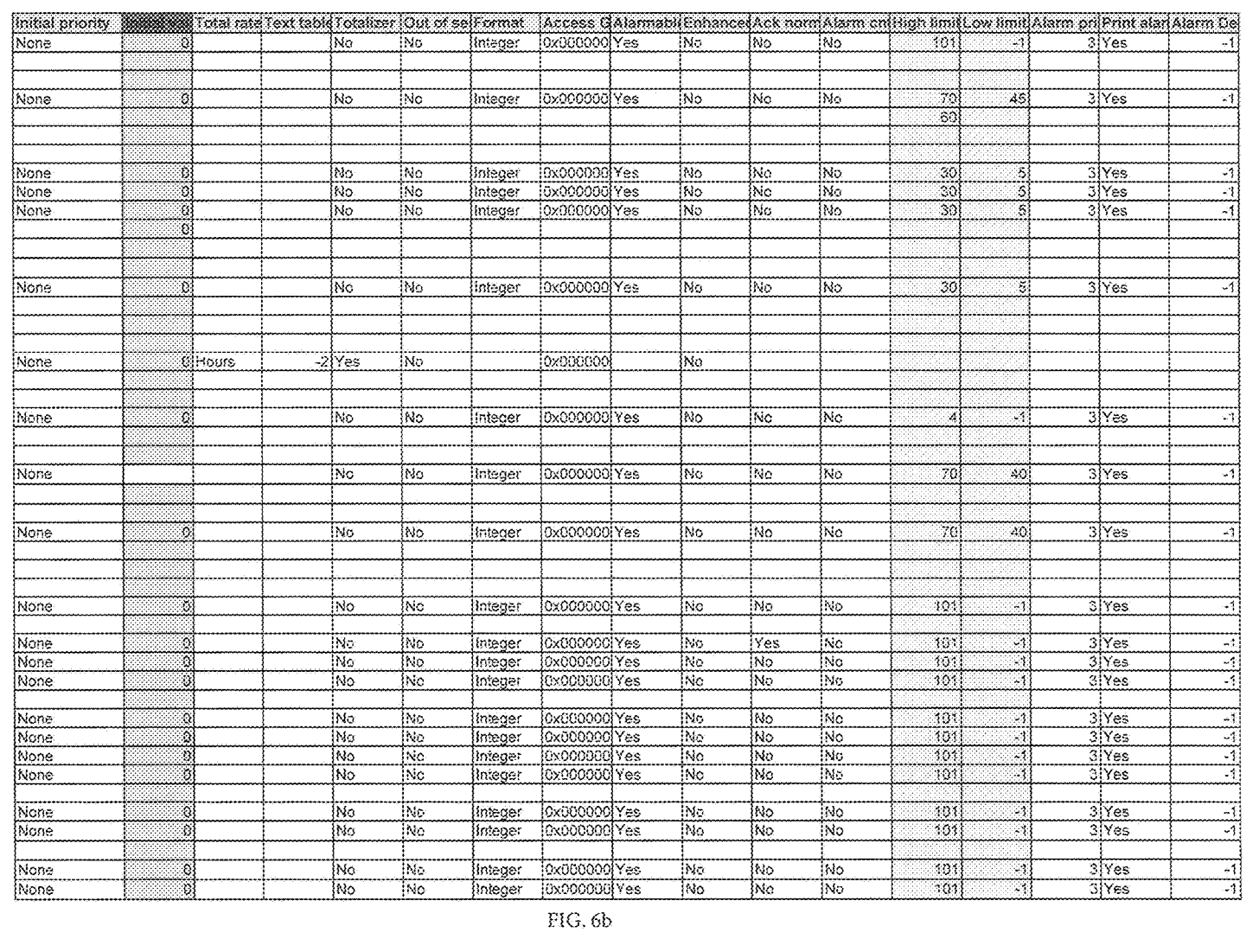
Figure 6C:
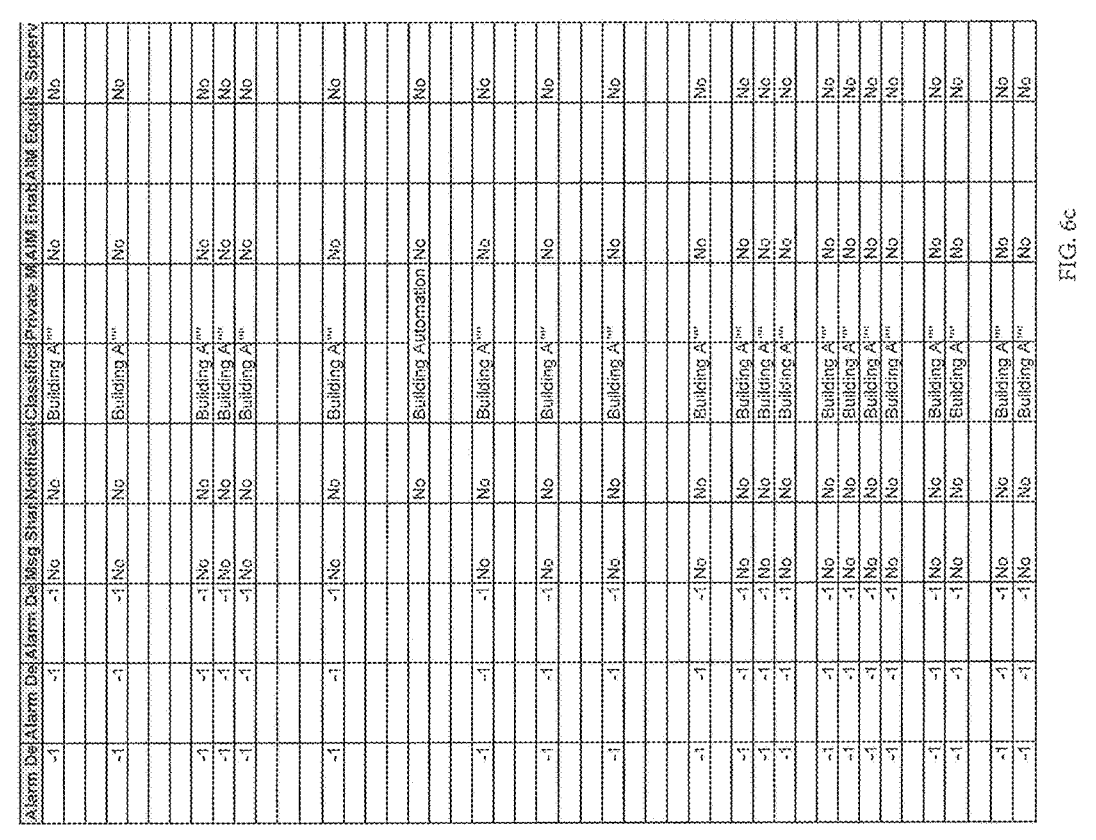

In FIGS. 6a-c, a point cross-reference list 600 is generated by the processor controlled device of FIG. 1 in accordance with an example implementation. The cross reference list provides a listing of points that includes the system name 602, user name 604 and object name 606 along with additional information that aids in the configuring and maintenance of the HVAC system of FIG. 4. Engineers at the site of the HVAC system 400 may only know user names of elements of the HVAC system and the cross reference allows programmers, technicians, and engineers to identify elements by multiple names.

Turning to FIGS. 7a-b, a SOO list 700 generated by the processor control device 100 of FIG. 1 executing the AEBASA in accordance with an example implementation is presented. The SSO provides a list of the different operational modes that have been encoded into the PPCL 400. The SSO is in a plain human readable language, English in the current example. In other implementations, other language may be used, such as French, German, Spanish, Russian, and Polish, to name but a few. The SSO enables engineers, technicians, and regular untrained people to understand how the HVAC system was programmed. The SSO initially list the hardware equipment 702 used in the HVAC system for which the PPCL 400 was generated. The different operational modes are then identified and explained 704-720.

In FIG. 8, a commissioning list 800 is generated by the AEBASA executed by the processor control device 100 of FIG. 1 in accordance with an example implementation of the invention. A list of items to be checked and validated by a field technician is provided. As some of the information in the initial HVAC engineering may have changed during construction or over time, the AEBASA provides the list of items to check and adjustments to make to the PPCL 400 when loaded into a field panel during commissioning. An example of hardware dependency is noise generated by the actual components. This type of dependency cannot be fine-tuned until the HVAC system is actually deployed in a building. But, the AEBASA identifies these parameters and creates the commissioning list for the field technician.

Turning to FIGS. 9a-f, a functional test set 900 generated by the processor control device 102 of FIG. 1 for testing the PPCL 400 of FIG. 4 in accordance with an example implementation of the invention is provided. The functional tests are run at the HVAC systems site during commissioning to verify the operation of the HVAC system. As the functional tests are generated in view of the PPCL 400 running in the field panel of the HVAC system, ad-hock testing by technicians is eliminated and quality of the commissioning process is increased by use of the AEBASA.

Figure 10:
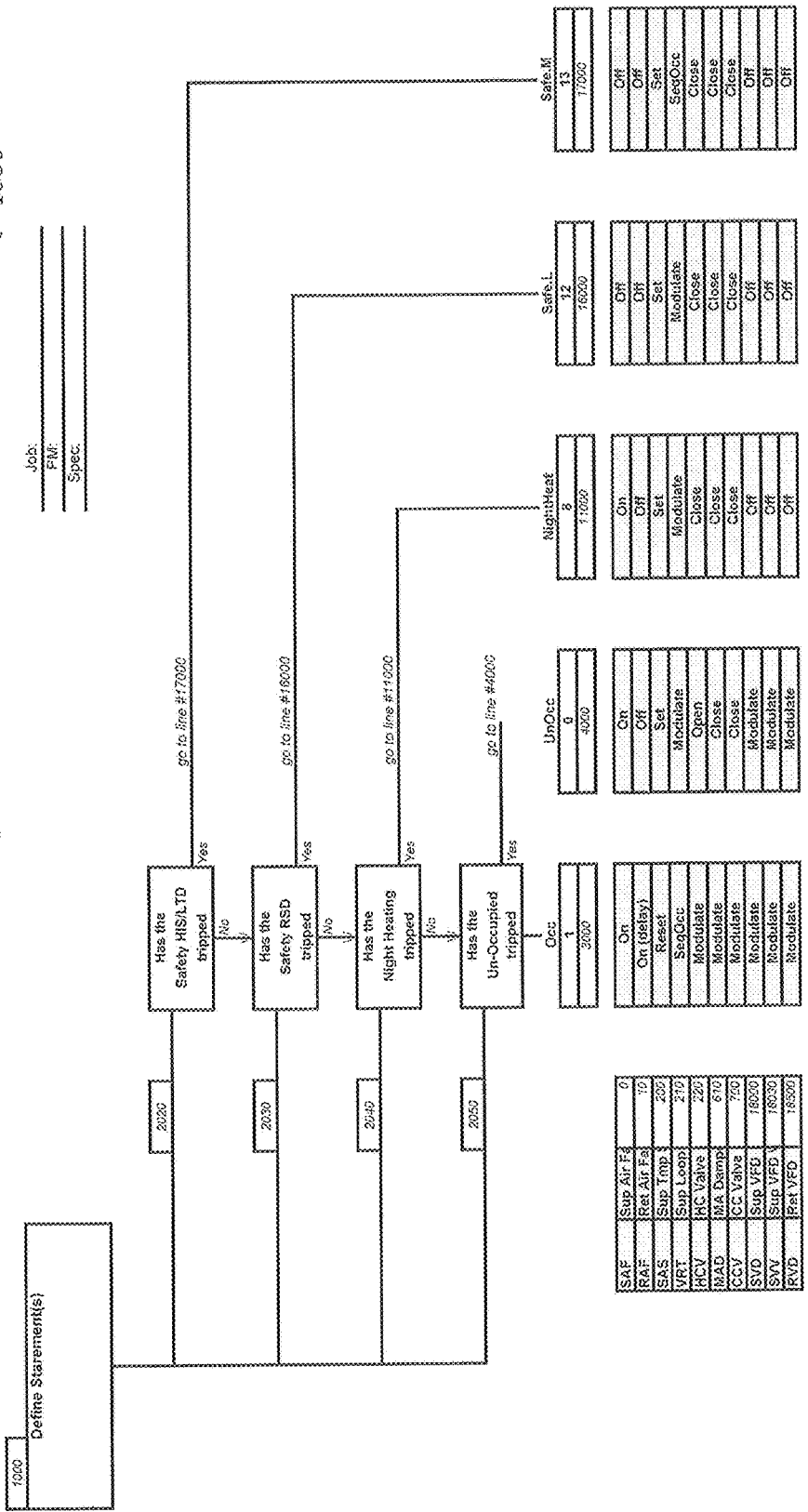
FIG. 10 is an illustration of a flow diagram of the PPCL of FIG. 4 generated by the processor controlled device of FIG. 1 in accordance with an example implementation of the invention.

In FIG. 10, flow diagram 1000 of the PPCL 400 of FIG. 4 generated by the processor controlled device 102 of FIG. 1 in accordance with an example implementation is illustrated. The flow diagram provides a visual illustration of the PPCL. Once again, the AEBASA provides another output that is readily readable by technicians, programs, and building engineers. The flow diagram 1000 illustrates the different modes of operation that were described in the SOO while providing additional technical information.

Figure 11:
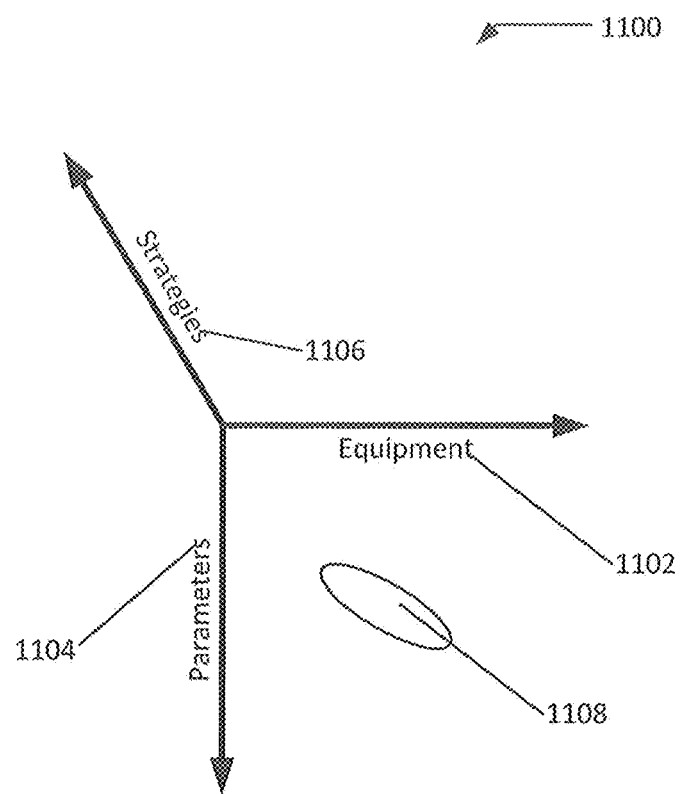
FIG. 11 is an illustration of a diagram for a data model employed by the AEBASA of FIG. 1 in accordance with an example implementation of the invention.

Turning to FIG. 11, a diagram 1100 for a data model employed by the AEBASA of 100 of FIG. 1 is illustrated in accordance with an example implementation. A multi-associated data model has four or more types of associations for the equipment 1102, parameters 1104 associated with the equipment, strategies 1106 that are implemented with the equipment 1102 and parameters 1104, and the association 1108 between parameters and strategies. For example different types of equipment may be a fan, an air cooler, and air mixer. Each piece of equipment has associated parameters that may be configured when initial provisioning of the HVAC system occurs. The parameters are set in association of different strategies (occupied, safety, off, night, etc.). But, modulation of fans and air coolers may have to be done in a synchronized manner. Thus, multi-associational data association must be created between different equipment. Different equipment and strategies may also be used to control humidity and is another example of multi-associational data. No other tool that has been created uses multi-associational data for configuration of systems. Further the use of multi-associational data model enables complete configuration of systems, such as HVAC systems via a query interface where a user is presented with a plurality questions after which programming for controllers' results for the system.

The use of the AEBASA enables multiple man-weeks of programming, testing, illustrating, and documentation generation to be saved when commissioning HVAC systems. A very simple example of the AEBASA has been provided with only a few elements and points. In practice, HVAC systems have many more elements and points with multiple field panels that each has to be programmed with PPCL or similar languages. Although PPCL programming language is used in the current example, other types of machine readable languages (text and/or graphical) may be employed. Other types of machine readable languages may be implemented as a compiled language or an interpreted language.

It will be understood, and is appreciated by persons skilled in the art, that one or more processes, sub-processes, or process steps described in connection with FIG. 3 may be performed by hardware and/or software (machine readable instructions). If the approach is performed by software, the software may reside in software memory (not shown) in a suitable electronic processing component or system such as one or more of the functional components or modules schematically depicted in the figures.

The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any tangible means that may contain or store the program for use by or in connection with the instruction execution system, apparatus, or device. The tangible computer readable medium may selectively be, for example, but is not limited to, an electronic, magnetic, optical, electromagnetic, infrared, or semiconductor system, apparatus or device. More specific examples, but nonetheless a non-exhaustive list, of tangible computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper (punch cards or punch tape) or another suitable medium upon which the instructions may be electronically captured, then compiled, interpreted or otherwise processed in a suitable manner if necessary, and stored in a computer memory.

The foregoing detailed description of one or more embodiments of the approach for provisioning a plurality of field panel in a HVAC system that control a plurality of points by generating PPCL and associated information automatically in response to being prompted for initial configuration information has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. A method for an automated engineering of building automation systems comprising:
   identifying a plurality of hardware elements of a HVAC system to the automated engineering of building automation systems application (AEBASA) controlled by a processor in a processor controlled device, wherein the plurality of hardware elements include at least one element selected from the group consisting of a fan, a control valve, a mixed air section, an air damper, or a variable frequency drive;
   identifying a plurality of operational modes for a HVAC system to the AEBASA, wherein the plurality of operational modes include at least one mode selected from the group consisting of an occupied mode, an unoccupied mode, a night heating mode, a life safety mode, or a mechanical safety mode;
   accessing a database of element characteristics associated with the plurality of hardware elements by the AEBASA, wherein the element characteristics include at least one characteristic selected from the group consisting of an on state, an off state, a set state, a reset state, an open state, a closed state, or a modulate state; and
   generating a program adapted to be executed by a controller of a field panel by the AEBASA in response to the identification of the plurality of hardware elements and the plurality of operational modes to the AEBASA, wherein generating the program comprises:
      generating a decision tree that associates each tripped instance of the HVAC system with a corresponding operational mode of the plurality of operational modes;
      generating a set of instructions for each operational mode of the plurality of operational modes; and
      generating control instructions to direct each tripped instance of the HVAC system from the decision tree to the set of instructions for the corresponding operational mode.

2. The method for an automated engineering of building automation systems of claim 1, further comprising generating a flow chart of the plurality of operational modes that identifies the plurality of hardware elements in the HVAC system.

3. The method for an automated engineering of building automation systems of claim 1, wherein the program is in a format of a power process control language (PPCL).

4. The method for an automated engineering of building automation systems of claim 1, wherein the program is in a downloadable format for downloading to a field panel.

5. The method for an automated engineering of building automation systems of claim 1, further comprising storing the program, description of the plurality of operational modes, commissioning list, and functional tests in a directory accessible by the processor controlled device.

6. The method for an automated engineering of building automation systems of claim 5, wherein the directory is located remotely from the processor controlled device.

7. The method for an automated engineering of building automation systems of claim 5, wherein the commissioning list is a checklist of items associated with the HVAC system.

8. The method for an automated engineering of building automation systems of claim 1, wherein the database of element characteristics is located remotely from the processor controlled device.

9. A method for generating a plurality of instructions for at least one controller of a HVAC system, comprising the steps of:
   displaying a plurality of questions generated by a processor and displayed on a display, wherein the plurality of questions are associated with a plurality of elements and a plurality of operational modes controlled by the at least one controller of the HVAC system;
   obtaining responses to the plurality of questions for operation of the plurality of elements with an input device coupled to the processor;
   accessing a database of element characteristics associated with the plurality of elements stored in a memory associated with the processor in response to the plurality of questions; and
   generating, by the processor, a plurality of instructions for the at least one controller, wherein generating the plurality of instructions comprises:
      generating a decision tree that associates each tripped instance of the HVAC system with a corresponding operational mode of the plurality of operational modes;
      generating a set of instructions for each operational mode of the plurality of operational modes; and
      generating control instructions to direct each tripped instance of the HVAC system from the decision tree to the set of instructions for the corresponding operational mode.

10. The method for generating a plurality of instructions for at least one controller of claim 9, wherein the plurality of elements include equipment as one type of data.

11. The method for generating a plurality of instructions for at least one controller of claim 10, wherein the plurality of operational modes include parameters associated with the equipment.

12. A device that generates a plurality of instructions for at least one controller of a HVAC system, comprising:
   a display that generates and displays a plurality of questions stored in a memory, wherein the plurality of questions are associated with a plurality of elements and a plurality of operational modes controlled by the at least one controller of the HVAC system;

an input device that receives input data in response to the plurality of questions for operation of the plurality of elements;

a processor coupled to the display and the input device that accesses a database of element characteristics associated with the plurality of elements in response to the input data and generates a plurality of instructions for the at least one controller stored as a file in the memory, wherein the plurality of instructions comprises:

generating a decision tree that associates each tripped instance of the HVAC system with a corresponding operational mode of the plurality of operational modes;

generating a set of instructions for each operational mode of the plurality of operational modes; and generating control instructions to direct each tripped instance of the HVAC system from the decision tree to the set of instructions for the corresponding operational mode.

13. The device that generates the plurality of instructions for the at least one controller of claim 12, wherein the plurality of elements include equipment as one type of data.

14. The device that generates the plurality of instructions for the at least one controller of claim 13, wherein the plurality of operational modes include parameters associated with the equipment.

15. The device that generates the plurality of instructions for the at least one controller of claim 12, wherein the memory is capable of being accessed by the processor over a network.

16. The device that generates the plurality of instructions for at least one controller of claim 12, wherein the processor is capable of generating a flowchart of the plurality of instructions for the at least one controller.

17. The device that generates the plurality of instructions for at least one controller of claim 12, wherein the processor is capable of generating a plurality of tests for a system executing the plurality of instructions for the at least one controller.

* * * * *